US007856413B2

(12) United States Patent
Cradick et al.

(10) Patent No.: US 7,856,413 B2
(45) Date of Patent: Dec. 21, 2010

(54) DYNAMIC SEARCH CRITERIA ON A SEARCH GRAPH

(75) Inventors: Connie M. Cradick, Rochester, MN (US); Ryan Kirk Cradick, Rochester, MN (US); Zachary Adam Garbow, Rochester, MN (US); Emuejevoke Jane-Frances Sanomi-Fleming, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/965,188

(22) Filed: Oct. 14, 2004

(65) Prior Publication Data

US 2006/0085395 A1 Apr. 20, 2006

(51) Int. Cl.
*G06F 7/00* (2006.01)
*G06F 17/30* (2006.01)
(52) U.S. Cl. .......................... 707/3; 787/785; 715/700
(58) Field of Classification Search ................. 707/1–4, 707/100; 787/785; 715/700
See application file for complete search history.

(56) References Cited

U.S. PATENT DOCUMENTS 6,003,034 A * 12/1999 Tuli ........................... 707/101
6,101,493 A * 8/2000 Marshall et al. ............... 707/3
6,463,431 B1 * 10/2002 Schmitt ......................... 707/5
6,754,660 B1 * 6/2004 MacPhail ..................... 707/100
7,444,358 B2 * 10/2008 Paczkowski et al. ...... 707/104.1
2004/0064438 A1 * 4/2004 Kostoff ........................... 707/1
2004/0249809 A1 * 12/2004 Ramani et al. ................. 707/4
2005/0004949 A1 * 1/2005 Trepess et al. ........... 707/104.1
2006/0059440 A1 * 3/2006 Pry .............................. 715/838

OTHER PUBLICATIONS

Krishna Bharat et al., Hilltop: A Search Engine based on Expert Documents, http://www-cs.toronto.edu/~georgem/hilltop/, Sep. 17, 2004, pp. 1-11.

* cited by examiner

*Primary Examiner*—Etienne P LeRoux
*Assistant Examiner*—Mohammad N Rahman
(74) *Attorney, Agent, or Firm*—Owen J. Gamon

(57) ABSTRACT

A method, apparatus, system, and signal-bearing medium that, in an embodiment, display icons representing search terms on a search graph, having at least one axis. The axis represents a search criteria. The position of the icon specifies a value (such as an importance or weight) of the search criteria. A search engine uses the search terms, the search criteria, and the value to conduct the search. The results of the search are displayed in a results pane, and the search results are updated as the positions of the icons on the search graph change. The search criteria associated with the axes of the search graph may also change. In this way, the user interface for the search is made easier for the user to control.

7 Claims, 4 Drawing Sheets

DYNAMIC SEARCH CRITERIA ON A SEARCH GRAPH

FIELD

An embodiment of the invention generally relates to computers. In particular, an embodiment of the invention generally relates to a dynamic search criteria on a search graph.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, such as the Internet or World Wide Web, and a user at one computer, often called a client, may wish to access information at multiple other computers, often called servers, via a network. Searching is the primary mechanism used to retrieve information from the Internet. Users typically search the web pages of the Internet using a search engine, such as AltaVista, Yahoo, or Google. These search engines index hundreds of millions of web pages and respond to tens of millions of queries every day.

To accomplish this formidable task, search engines typically employ three major elements. The first is an agent, often called a spider, robot, or crawler. The crawler visits a web page, reads it, and then follows links to other pages within the site. The crawler typically returns to the site on a regular basis, such as every month or two, to look for changes. The crawler stores the information it finds in the second part of the search engine, which is the index. Sometimes new pages or changes that the crawler finds may take some time to be added to the index. Thus, a web page may have been "crawled" but not yet "indexed." Until the web page has been added to the index, the web page is not available to those searching with the search engine.

The third part of the search engine is the program that interrogates the millions of pages recorded in the pre-created index to find matches to a search and ranks them in order that the program believes is most relevant, which is often referred to as web site ranking. Web site ranking is extremely important to the user because a simple search using common terms may match thousands or even tens of thousands of pages, which would be virtually impossible for the user to individually sort through in an attempt to determine relevancy.

In order to aid the user, search engines typically determine relevancy by following a set of rules, which is commonly known as the web site ranking algorithm. Exactly how a particular search engine's algorithm works is usually a closely-guarded trade secret. But, all major search engines follow the same generally-accepted methods described below. One of the main methods in a web site ranking algorithm involves the location and frequency of keywords (search terms) on a web page, which is known as the location/frequency method. For example, web site-ranking algorithms often assume that terms appearing in a title control-tag are more relevant than terms appearing at other locations in the page. Further, many web site ranking algorithms will also check to determine whether the search keywords appear near the top of a web page, such as in the headline or in the first few paragraphs of text. They assume that a page relevant to the topic will mention those words at the beginning. Frequency of keywords is the other major factor that web site ranking algorithms use to determine relevancy. The web site ranking algorithm analyzes how often keywords appear in relation to other words in a web page and deems more relevant those with a higher frequency.

In addition to the location/frequency method, which is an on-the-page criteria, search engines also typically make use of off-the-page criteria. Off-the-page criteria are those that use data external to the page itself. Chief among these is link analysis. By analyzing how pages link to each other, the web site ranking algorithm attempts to determine both the subject of a page and the relative importance of the page with respect to other pages.

Hence, as previously described above, the web site ranking algorithm is a very sophisticated technique. Further, the web site ranking algorithm is largely hidden from the user who is requesting the search, who often has little or no control over the criteria used in the web site ranking algorithm. To the extent that the user has control over some of the criteria, adjusting a limited set of criteria via a text box is unintuitive, slow, cumbersome, and likely produces unexpected results.

Thus, without a better interface for controlling search criteria, users will continue to experience difficulty in searching.

SUMMARY

A method, apparatus, system, and signal-bearing medium are provided that, in an embodiment, display icons representing search terms on a search graph, having at least one axis. The axis represents a search criteria. The position of the icon specifies a value (such as an importance or weight) of the search criteria. A search engine uses the search terms, the search criteria, and the value to conduct the search. The results of the search are displayed in a results pane, and the search results are updated as the positions of the icons on the search graph change. The search criteria associated with the axes of the search graph may also change. In this way, the user interface for the search is made easier for the user to control.

DETAILED DESCRIPTION

Figure 1:
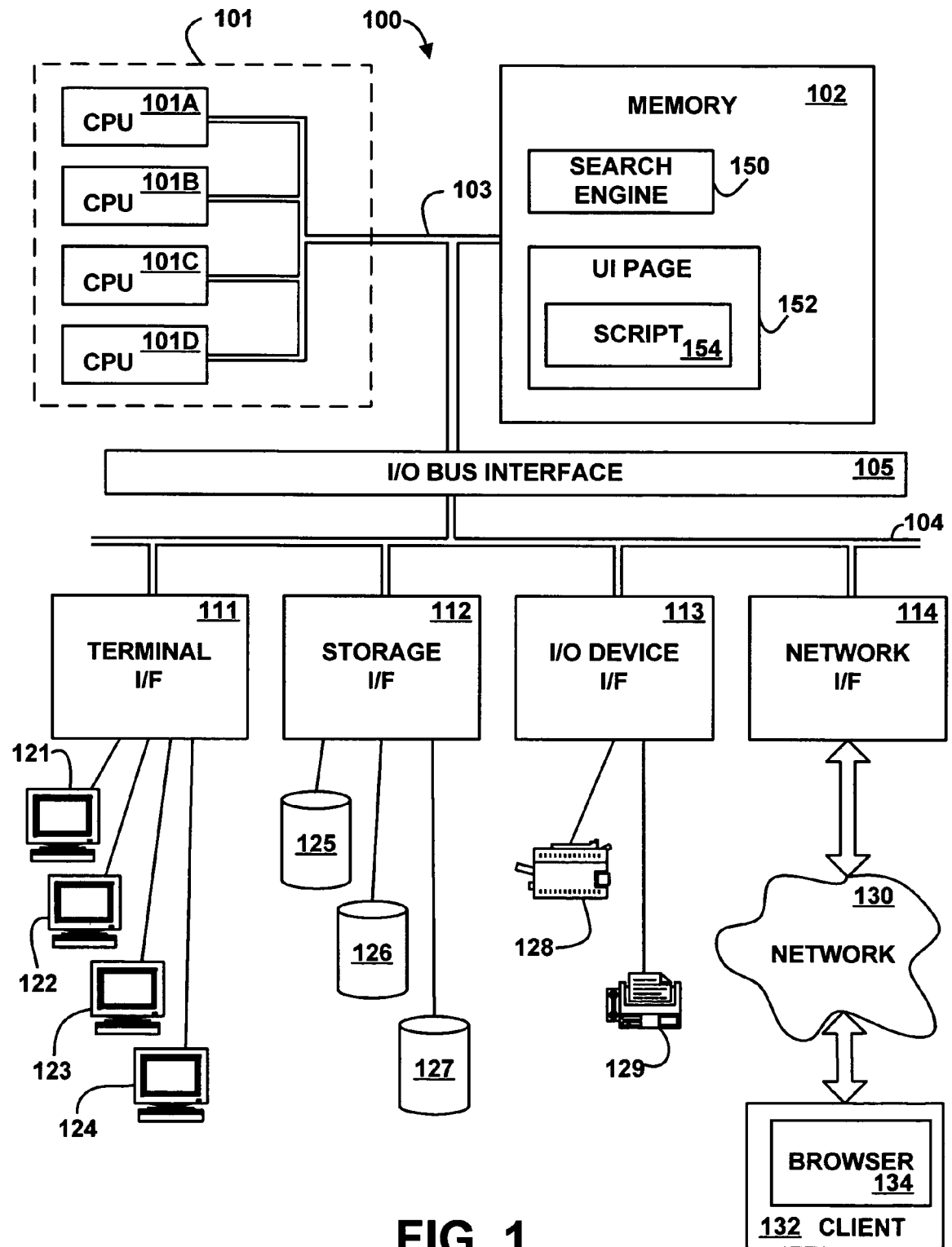
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to a client 132 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a search engine 150 and a user interface page 152. Although the search engine 150 and the user interface page 152 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the search engine 150 and the user interface page 152 are illustrated as being contained within the main memory 102, these elements are not necessarily all completely contained in the same storage device at the same time.

In an embodiment, the search engine 150 includes instructions capable of executing on the processor 101 or statements capable of being interpreted by instructions executing on the processor 101 to perform the functions as further described below with reference to FIGS. 3 and 4. In another embodiment, the search engine 150 may be implemented in microcode. In another embodiment, the search engine 150 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The client 132 includes a browser 134. The browser 134 downloads the user interface page 152, interprets the control tags and data in the user interface page 152, and executes or interprets the script 154. The browser 134 and the script 154 may include instructions or statements capable of being executed on an unillustrated processor, analogous to the processor 101, or interpreted by instructions executing on the unillustrated processor, in order to perform the functions as further described below with reference to FIGS. 2, 3, and 4. In an embodiment, the script 154 is implemented via JavaScript, but in other embodiments, the script 154 may be implemented via an applet, an XML (Extensible Markup Language) document, or any other appropriate language or protocol. The user interface page 152 may be implemented via HTML (Hypertext Markup Language), XML, or any other appropriate markup language. The client 132 may also include any or all of the hardware and/or software elements previously described above for the computer system 100.

Although the browser 134, the search engine 150, the user interface page 152, and the script 154 are illustrated as being separate elements, in other embodiments the functions of some or all of them may be combined. For example, in an embodiment, some or all of the browser 134, the user interface page 152, and the script 154 are not present or not used, and their functions are performed by the search engine 150.

It should be understood that FIG. 1 is intended to depict the representative major components of the computer system 100, the network 130, and the client 132 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100 and/or the client 132, cause the computer system 100 and/or the client 132 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 and/or the client 132 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
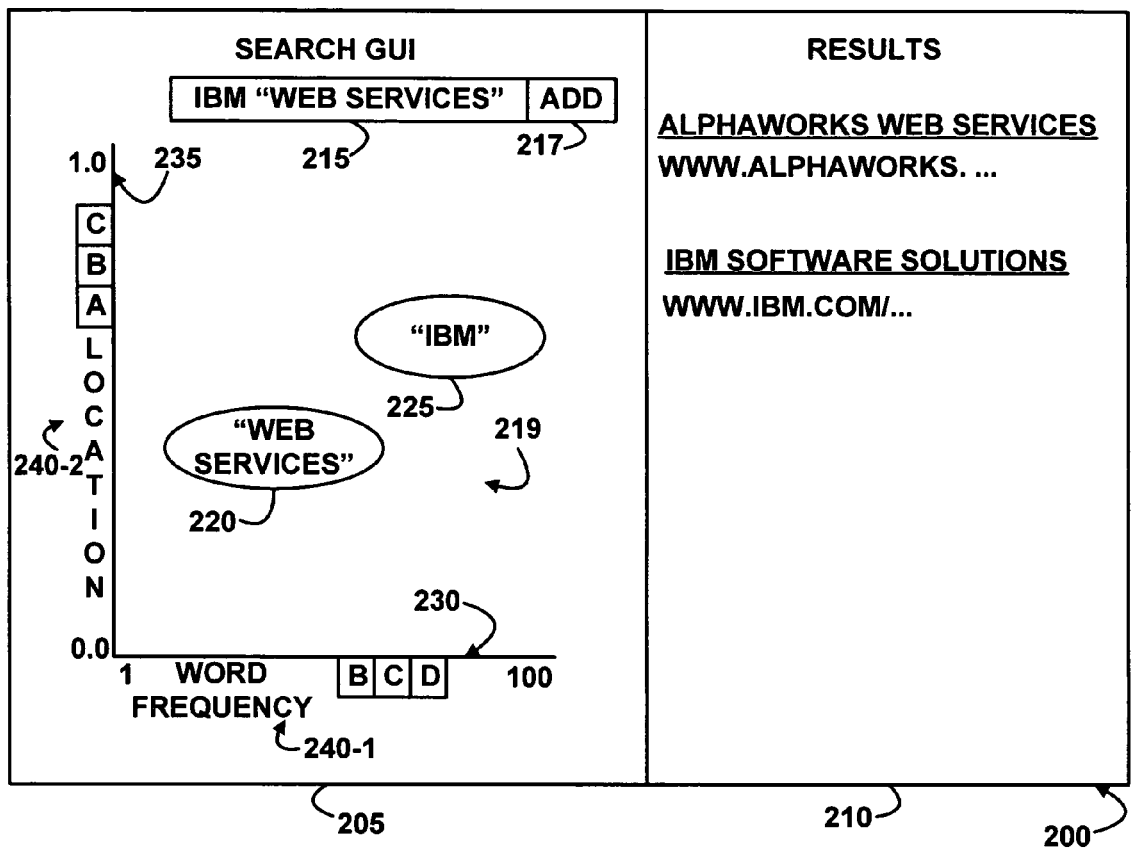
FIG. 2 depicts a pictorial representation of a graphical user interface, according to an embodiment of the invention.

FIG. 2 depicts a pictorial representation of a graphical user interface 200, according to an embodiment of the invention. The graphical user interface 200 is displayed by the browser 134 by interpreting the user interface page 152 and/or interpreting or executing the script 154. The graphical user interface 200 includes a search pane 205 and a results pane 210. The search pane 205 includes an entry field for adding search terms 215, a button to add a term 217, and a search graph 219. The search graph 219 includes an x-axis (horizontal axis) 230 and a y-axis (vertical axis) 235, which represent the search criteria 240-1 on the x-axis 230 and the search criteria 240-2 on the y-axis 235, using a typical Cartesian coordinate system.

After the user enters the search terms 215 in the entry field and selects the button to add a term 217, in response, the script 154 displays the corresponding icons 220 and 225 on the search graph 219 displayed at a respective positions on the search graph 219 with respect to the x-axis 230 and the y-axis 235. Each of the positions of the icons 220 and 225 specifies an value (corresponding to an importance or weight) of the search criteria 240-1 and 240-2.

The script 154 submits the search terms 215, the search criteria 240-1 and 240-2, and the values of the search criteria 240-1 and 240-2 (determined by the positions of the icons 220 and 225) to the search engine 150. After the search engine 150 performs the search using the search terms 215, the search criteria 240-1 and 240-2, and the values based on the positions of the icons 220 and 225, the script 154 downloads the search results, and the script 154 displays the search results in the results pane 210.

As the user moves the icons 220 and 225 on the search graph 219, (and optionally changes/adds the search terms 215) the script 154 resubmits the positions, the search criteria 240-1 and 240-2, and search terms 215 to the search engine 150, and re-downloads the corresponding search results for display. Thus, the script 154 dynamically changes the contents of the results pane 210 in response to the dynamic changing of the positions of the icons 220 and 225 on the search graph 219. Although the results pane 210 and the search graph 219 are illustrated in FIG. 2 as being displayed concurrently, in another embodiment they may be displayed separately.

In the example shown, the search criteria 240-1 is "word frequency." Word frequency (shown on the x-axis 230 as a value between 1 and 100 words, but any range may be used) indicates how close two or more search terms must be to each other in order to consider the web page a match for the search terms 215. In the example shown in FIG. 2, the user has positioned (via the script 154 ) the icon 220 to a lower value than the icon 225 on the word frequency x-axis 230, indicating that the importance of the word frequency search criteria for the icon 220 is less important than the word frequency search criteria for the icon 225. In another embodiment, a lower icon on the search graph 219 indicates that search term must come first in the found document or web page.

In the example shown, the search criteria 240-2 is "location,"which represents a value between 0.0 and 1.0 (or 0% and 100%) and indicates the importance of where a search phrase shows up within a searched page or document. For example, when the search term is found in the head or title of the page or document, the term is likely more important than if the search term appears later in a large paragraph. In the example shown, the user has positioned (via the script 154) the icon 225 higher than the icon 220 on the y-axis 235, indicating that the location of the search term associated with the icon 225 is more important then the location of the search term associated with the icon 220.

An example priority ranking for location importance, from most important to least important, is as follows: domain name, page title, headings, body text (initial portion counts more than the rest), links (including keywords buried in the URL, name, or id attributes of a link), alt text, tables, table headers, table data tags, table captions, and meta tags. But, in other embodiments, the search engine 150 or the script 154 may use any appropriate priority ranking.

Word frequency and location are only examples of search criteria, and in other embodiments any appropriate criteria may be used, such as, but not limited to link popularity, anchor text, back links, phrase density, authoritativeness, frequency in nested pages, currently updated, and current users, as further described below.

The "link popularity" search criteria relates to the number of pages that link to the found page. Using the example of FIG. 2, a search term with a position on the search graph 219 that indicates a higher importance of link popularity specifies that the user desires results pages that are linked to by a higher number of other pages.

The "anchor text" search criteria relates to a text phrase that identifies a link in a page. Using the example of FIG. 2, a search term with a position on the search graph 219 that indicates a higher importance of the anchor text criteria specifies that the user desires results pages that have a higher incidence of the search term in the anchor text.

The "back links" search criteria relates to incoming links that link to a particular page.

The "phrase density" search criteria is the search term frequency divided by the total number of words in a page. Using the example of FIG. 2, a search term with a position on the search graph 219 that indicates a higher importance of phrase density specifies that the user desires results pages that have a higher incidence of the search term divided by the number of words in the page.

The "authoritativeness" search criteria relates to the number of non-affiliated expert pages that link to the page that contains the search terms. An expert page on a topic is one that has many links to other pages on the same topic. The authoritativeness criteria is also known as the "hilltop algorithm." Using the example of FIG. 2, a search term with a position on the search graph 219 that indicates a higher importance of authoritativeness specifies that the user desires results pages that are linked to by a higher number of expert pages.

The "frequency in nested pages" search criteria relates to the number of hits for the term in the pages to which the original page links. The frequency in nested pages criteria directs the search engine 150 to search the frequency of the word in the original page and all pages to which it links. The frequency criteria also helps validate that the page is associated with other page that contain the same term. To reduce the impact of a web-like effect, the search engine 150 just searches the first-level page that is linked to.

The "currently updated" search criteria refers to pages that have time stamps that indicate the last time the page was updated. The user specifies what date is acceptable, such as one week old, three months old, or any other appropriate age. The currently update search criteria causes the search engine 150 to search the meta data information for time stamps, search for any date and time value on the page, or search when the last time the file was uploaded. In an embodiment, the axis on the search graph 219 has a range from old to new, but in other embodiments, the axis may include discrete values or any other appropriate range.

The "current users" search criteria relates to the pages that are being viewed by another user at that moment in time. The current users criteria ensures that the page is not an unused page. In an embodiment, the user also specifies how many users must be currently viewing the page.

The user may select the search criteria to be represented on the axes 230 and 235 and change from one search criteria to another. Search criteria that are available, but not currently represented on the axes 230 or 235 are identified by the icons A, B, C, and D, but in other embodiments any number of unrepresented criteria may be available with any appropriate icons. Upon selection of one of the icons A, B, C, or D, identifying the available criteria, the script 154 changes the criteria represented by the corresponding axis 230 or 235. In an embodiment, once the search criteria for an axis has been changed and is no longer displayed, the script 154 does not submit the undisplayed search criteria and the corresponding value to the search engine 150. In another embodiment, the script 154 still submits undisplayed search criteria and corresponding value to the search engine 150.

Although the two axes 230 and 235 are shown, in other embodiment only one axis or any number of axes may be present with corresponding any number of search criteria. Although two icons 220 and 225 are shown representing two respective search terms, in other embodiments any number of icons may be present representing any number of search terms, and the number of search terms need not be identical to the number of axes. In various embodiments, the icons may be moved individually or together. Although the two icons 220 and 225 are illustrated to include the text of their respective associated search terms, in other embodiments, the icons may include only a portion or none at all of their associated represented search terms. Although the icons 220 and 225 are illustrated as displayed on the search graph 219, in another embodiment, one or all of the icons 220 and 225 may be dragged or moved off of the search graph 219, which causes the script 154 to not submit the value of the associated search criteria to the search engine 150. In another embodiment, removing an icon from the search graph 219 also causes the script 154 to not submit the search term associated with the removed icon to the search engine 150. The search terms 215 illustrated in FIG. 2 are examples only, and in other embodiments any number and type of search terms may be used. Further, although no connectors, operators, or field designators are illustrated for the search terms 215, in other embodiments any appropriate connectors, operators, or field designators, e.g., "and," "or," "not," or "within," may be used.

Figure 3:
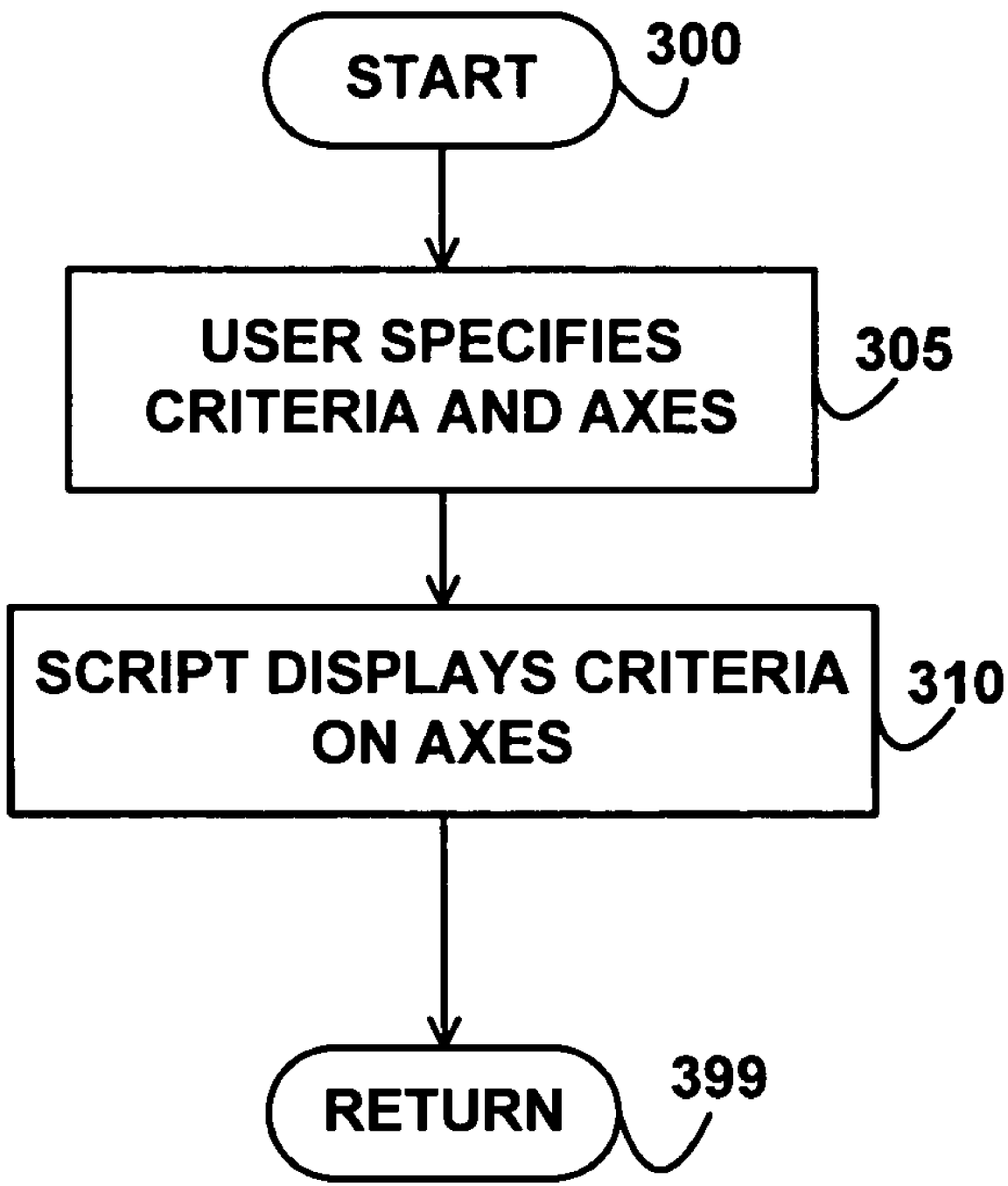
FIG. 3 depicts a flowchart of example processing for displaying criteria, according to an embodiment of the invention.

FIG. 3 depicts a flowchart of example processing for displaying search criteria, according to an embodiment of the invention. Control begins at block 300. Control then continues to block 305 where the user specifies the search criteria, e.g., the search criteria 240-1 and 240-2, and the axes of the search graph 219. Control then continues to block 310 where the script 154 displays the search criteria on the axes 230 and 235. Control then continues to block 399 where the logic of FIG. 3 returns. The logic of FIG. 3 may be executed at any time to allow the user to add additional search criteria, or to change the search criteria currently being displayed on the search graph 219.

Figure 4:
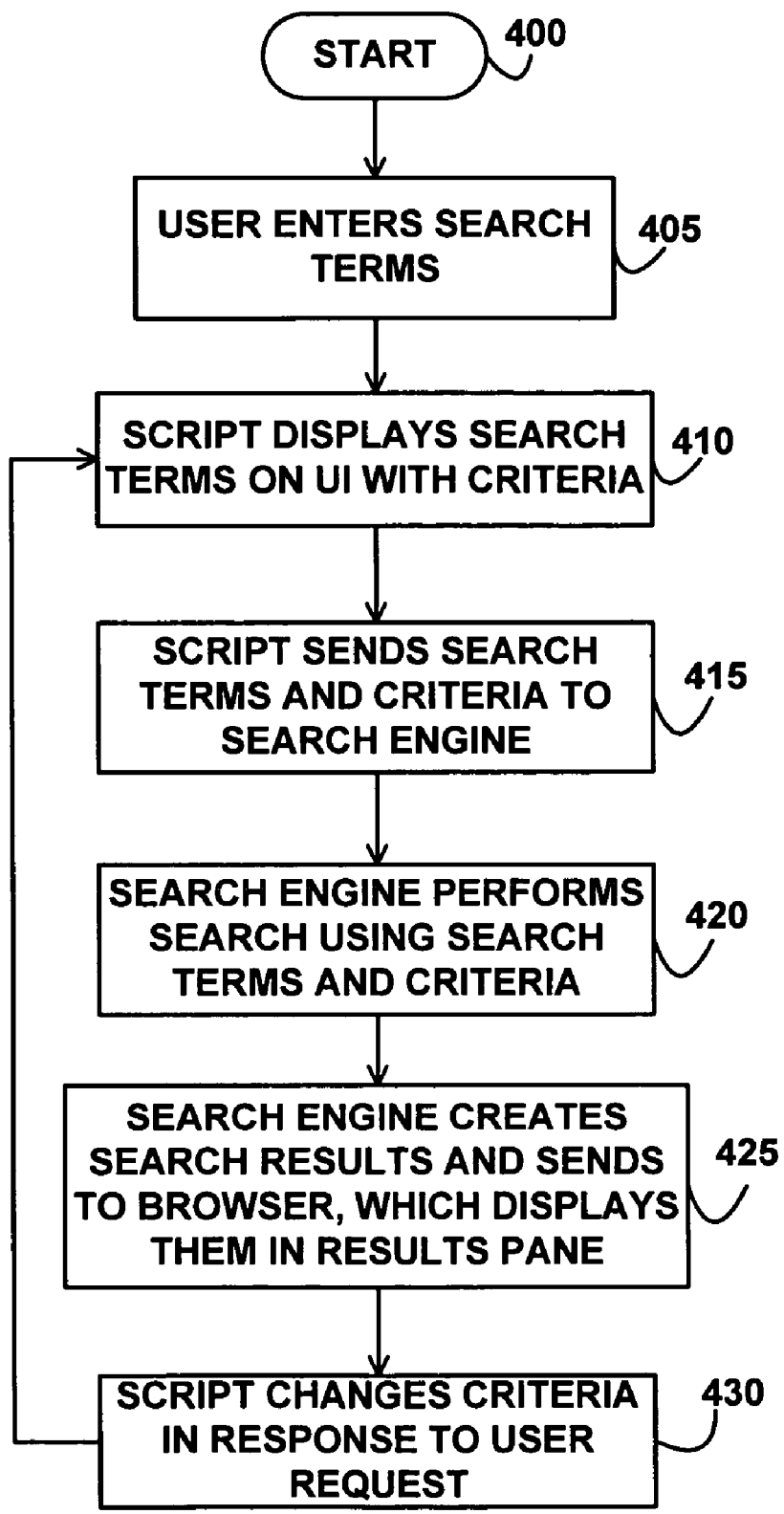
FIG. 4 depicts a flowchart of example processing for dynamically adjusting search criteria, according to an embodiment of the invention.

FIG. 4 depicts a flowchart of example processing for dynamically adjusting the value of the search criteria, according to an embodiment of the invention. Control begins at block 400. Control then continues to block 405 where the user enters the search terms 215 via the user interface 200. Control then continues to block 410 where the script 154, in response to the button to add a term 217 on the user interface 200, adds icons representing the search terms 215 to the search graph 219 as, e.g., the icons 220 and 225. Control then continues to block 415 where the script 154 sends the search terms 215, the search criteria 240-1 and 240-2, and the respective value of the search criteria, as represented by the position of the icons 220 and 225, to the search engine 150.

Control then continues to block 420 where the search engine 150 performs the search using the search terms 215, the search criteria 240-1 and 240-2, and the value of the search criteria from the positions of the icons 220 and 225 on the search graph 219. Control then continues to block 425 where the search engine 150 creates the search results and sends them to the browser 134, which displays the search results in the results pane 210 by interpreting the downloaded page. Control then continues to block 430 where the script 154 adjusts the value of the search criteria 240-1 and 240-2 in response to the user optionally requesting a change of the positions of the icons 220 and 225. Control then returns to block 410, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method for creating a page, wherein the page when interpreted comprises:

displaying a search graph, wherein the search graph comprises a plurality of axes, and the plurality of axes represent a plurality of respective search criteria;

displaying a plurality of icons representing a plurality of respective search terms at a plurality of respective positions on the search graph, wherein the plurality of respective positions specify a plurality of respective values of the search criteria for the search term, wherein each of the plurality of respective values represents a relative importance of all of the plurality of search criteria for each of the plurality of respective search terms, wherein the plurality of respective search terms are entered by a user, wherein a first axis of the plurality of axes represents the relative importance of how close the plurality of search terms must be in a page for the page to be a match for the plurality of search terms, and wherein a second axis of the plurality of axes represents the relative importance of phrase density, wherein phrase density comprises a frequency of the plurality of respective search terms in the page divided by a number of words in the page;

submitting the search term and the value of the search criteria to a search engine, wherein the search engine searches for the page;

displaying search results from the search engine;

adjusting the plurality of values of the respective search criteria for the plurality of search terms in response to a user requesting a change to the plurality of respective positions of the plurality of icons representing the plurality of respective search terms on the search graph;

moving one of the plurality of icons off of the search graph; and updating the search results in response to the change in the position on the search graph.

2. The method of claim 1, further comprising:

changing the search criteria on the plurality of axes.

3. The method of claim 1, further comprising:

displaying the search results in a results pane, wherein the results pane is concurrently visible with the search graph.

4. A method for configuring a computer, comprising:

configuring the computer to create a user interface page, wherein the user interface page when interpreted displays a search graph, wherein the search graph comprises a plurality of axes, and the plurality of axes represent a plurality of respective search criteria;

configuring the computer to create the user interface page, wherein the user interface page when interpreted displays a plurality of icons representing a plurality of respective search terms at a plurality of respective positions on the search graph, wherein the plurality of respective positions specify a plurality of respective values of the search criteria for the search term, wherein each of the plurality of respective values represents a relative importance of all of the plurality of search criteria for each of the plurality of respective search terms, wherein the plurality of respective search terms are entered by a user, wherein a first axis of the plurality of axes represents the relative importance of how close the plurality of search terms must be in a web page for the web page to be a match for the plurality of search terms, and wherein a second axis of the plurality of axes represents the relative importance of phrase density, wherein phrase density comprises a frequency of the plurality of respective search terms in the web page divided by a number of words in the web page;

configuring the computer to submit the search term and the value of the search criteria to a search engine, wherein the search engine searches for the web page;

configuring the computer to display search results from the search engine; and configuring the computer to adjust the plurality of values of the respective search criteria for the plurality of search terms in response to a user requesting a change to the plurality of respective positions of the plurality of icons representing the plurality of respective search terms on the search graph;

configuring the computer to move one of the plurality of icons off of the search graph; and configuring the computer to update the search results in response to the change in the position on the search graph.

5. The method of claim 4, further comprising:

configuring the computer to refrain from submitting the term associated with the one of the plurality of icons to the search engine in response to the configuring the computer to move.

6. The method of claim 4, further comprising:

configuring the computer to change the search criteria on the plurality of axes.

7. The method of claim 4, further comprising:

configuring the computer to display the search results in a results pane, wherein the results pane is concurrently visible with the search graph.

* * * * *